W. W. WILE.
CARBON HOLDER.
APPLICATION FILED MAY 1, 1914.
1,127,558.
Patented Feb. 9, 1915.
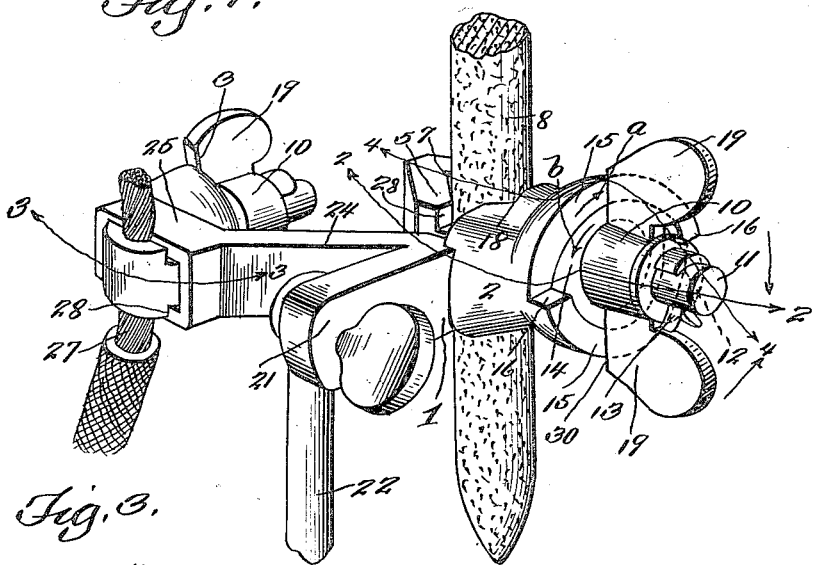
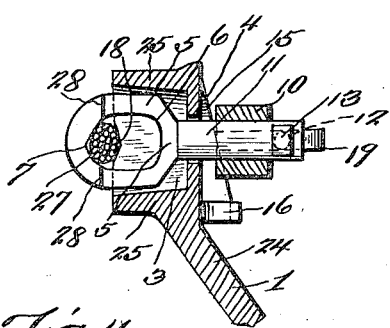
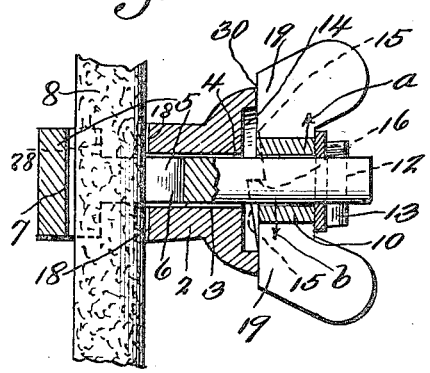
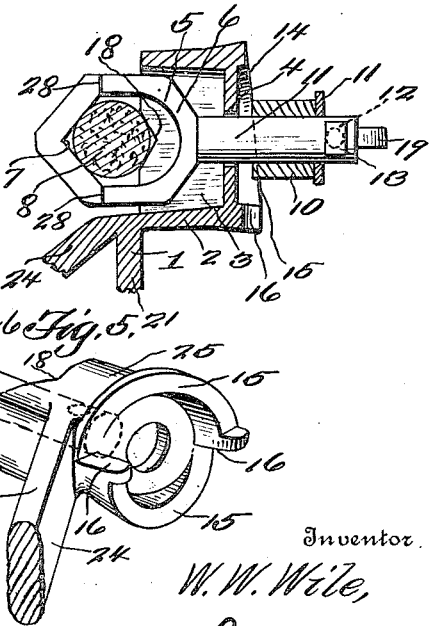
Witnesses
A. R. Wolfe,
Thomas T. Boswell.
Inventor
W. W. Wile,
By D. Swift &
Co. Attorneys

UNITED STATES PATENT OFFICE.

WILLIAM W. WILE, OF BLUFFTON, INDIANA.

CARBON-HOLDER.

1,127,558.  Specification of Letters Patent.  Patented Feb. 9, 1915.

Application filed May 1, 1914. Serial No. 835,719.

*To all whom it may concern:*

Be it known that I, WILLIAM W. WILE, a citizen of the United States, residing at Bluffton, in the county of Wells and State of Indiana, have invented a new and useful Carbon-Holder; and I do hereby declare the following to be a full, clear, and exact description of the invention, such as will enable others skilled in the art to which it appertains to make and use the same.

This invention relates to a new and useful carbon holder.

One of the objects of the invention is to improve and render more efficient and practical the carbon holder described, shown and claimed in the application of W. W. Wile, filed October 10, 1912, Serial No. 724,993 which has matured into patent of January 13, 1914, No. 1,084,379.

In practical fields the details of construction may be subjected to alterations, falling within the scope of what is claimed.

The invention comprises further features and combination of parts, as hereinafter set forth, shown in the drawings and claimed.

In the drawings:—Figure 1 is a view in perspective of the carbon holder constructed in accordance with the invention. Fig. 2 is a sectional view on line 2—2 of Fig. 1. Fig. 3 is a sectional view on line 3—3 of Fig. 1. Fig. 4 is a sectional view on line 4—4 of Fig. 1. Fig. 5 is a detail view of one of the clamps.

Referring more especially to the drawings. 1 designates the holder having a head 2. This head is constructed with an oblong recess or cavity 3 provided with a cylindrical or circular aperture 4 in one wall of the recess of the head. This recess 3 receives the clamp 5, which is substantially circular, as shown at 6. In one wall of the clamp an angular recess 7 is constructed, and in which the carbon 8 is clamped. The circular portion 6 of the clamp is provided with a cylindrical extension 11 designed to extend through the aperture 4, and receives a winged sleeve 10. The end portion of the extension 11 is provided with an aperture 12, to receive a retaining cotter pin or plug 13, to hold the winged sleeve in place on the extension, there being a washer interposed between the cotter pin and the sleeve. The head 2 upon the face 14 thereof is provided with a pair of helical cams 15 merging from shoulders 16. When the clamp 5 is arranged as shown in the drawings, the circular portion of the clamp engaging said recess 3 or cavity, and the extension through the aperture 4, the carbon may be securely clamped in position, between the angular recess 7 and the notches 18 of the head 2, by turning the winged sleeve in the direction of the arrow *a*, causing the wings 19 of the sleeve to ride upon the helical cams or surfaces sufficiently to draw the clamp in place. In Fig. 1 the winged sleeve has been turned sufficiently to clamp the carbon. When turning the winged sleeve in the direction of the arrow *b*, the shoulders of said helical cam surfaces are contacted with by said wings, thereby limiting the sleeve in its partial rotation, so that the carbon may be detached.

Projecting from the head 2 of the carbon holder is a laterally extending arm 21, which is attached to a vertically movable rod 22 of a moving picture machine (not shown). The holder is provided with an additional arm 24, which terminates in another head 25, constructed similar to the head 2, and adapted to coöperate and receive a clamp similar in construction to the clamp 5 having a winged sleeve and securing or holding means. The various parts of this additional head, clamp, and winged sleeve including the securing or holding means are designated by the same characters as the corresponding parts, previously set forth. However, the helical cams or surfaces of the additional head are of a greater incline, and the purpose of this is to cause a greater movement to be imparted to the clamp when drawing it toward the additional head to clamp the wire cable or conductor 27, which becomes considerably depressed or mashed between the clamp and the head in said recess of the clamp and the notches of the head. When there is no carbon or conductor clamped in place, and the winged sleeves are moved to draw the clamps within the heads, they are limited in their movements by the shoulders 28 of the clamps coming in contact with said heads. The wings of said sleeves are provided with beveled or inclined edges to ride against the helical cam surfaces, said beveled edges are designated by the numeral 30.

The invention having been set forth, what is claimed as new and useful is:—

A carbon holder comprising an arm terminating in a head plate having an oblong cavity therein and a circular opening or aperture adjacent the cavity, said head plate having its face provided with helical cam surfaces, a clamp having a circular portion to fit said oblong cavity and provided with a cylindrical extension extending from the circular portion and projecting through the circular opening or aperture, said clamp adapted to clamp a member terminal between it and the head plate, a sleeve revolubly mounted upon the cylindrical extension having laterally extending wings to ride against said helical cam surfaces, to draw the clamp toward the head plate to clamp the terminal, retaining means upon the end portion of the cylindrical extension to hold the sleeve in place and acting as abutting means between which and the head plate said sleeve and wings operate, said clamp having an angular recess, said head plate having notches, between which and the annular recess of the clamp, said terminal member engages, said wings having inclined edges or surfaces to ride against said cam surfaces.

In testimony whereof I have signed my name to this specification in the presence of two subscribing witnesses.

WILLIAM W. WILE.

Witnesses:
WILL B. GUTELIUS,
CHAS. E. STURGIS.